(No Model.) 7 Sheets—Sheet 1.
W. RAAB.
PNEUMATIC AND SPIRIT PRESSURE SCALE.
No. 566,698. Patented Aug. 25, 1896.
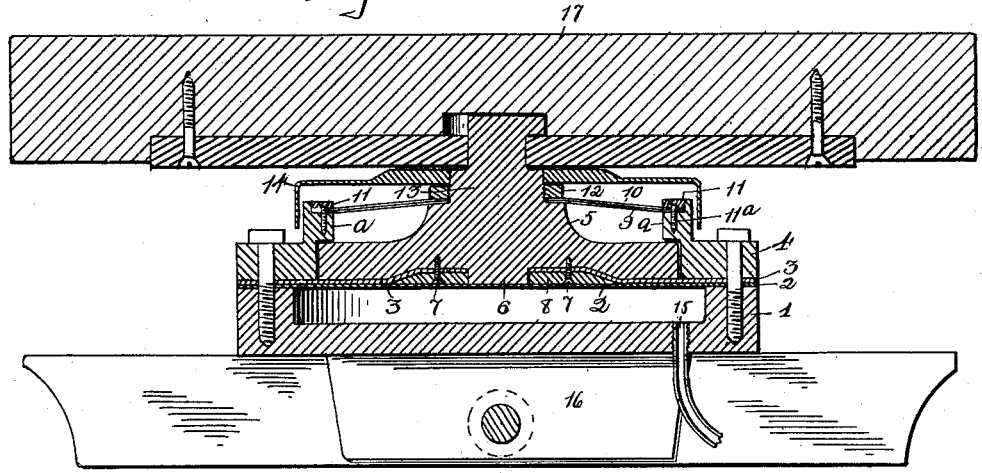
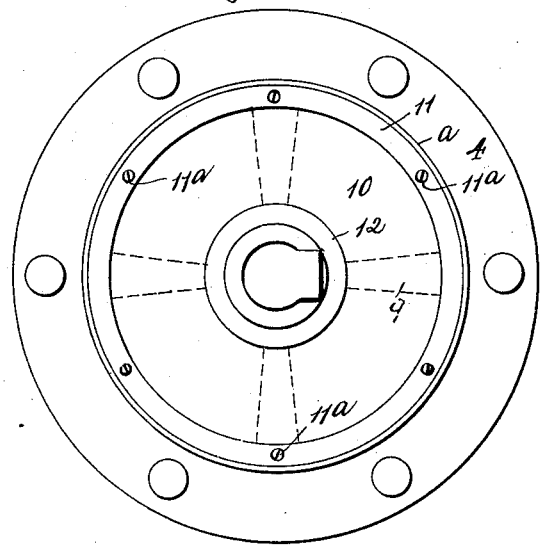
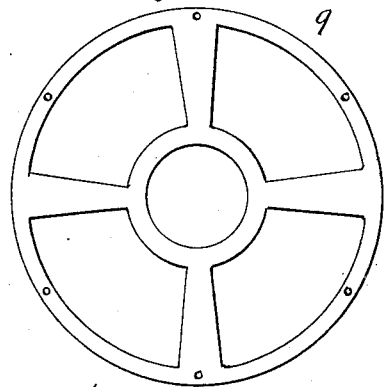
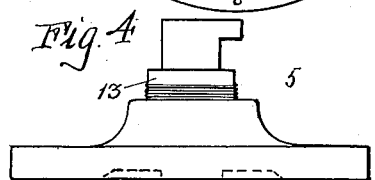
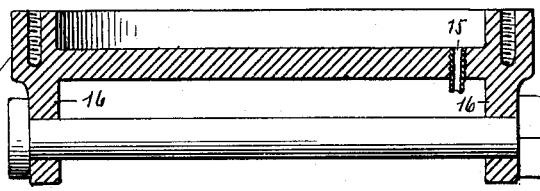
Witnesses:
Geo. M. Anderson
Phil. C. Masi.
Inventor:
William Raab
by E. W. Anderson
his Attorney.

(No Model.) 7 Sheets—Sheet 2.
W. RAAB.
PNEUMATIC AND SPIRIT PRESSURE SCALE.
No. 566,698. Patented Aug. 25, 1896.
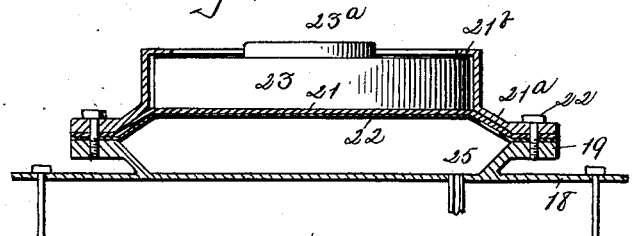
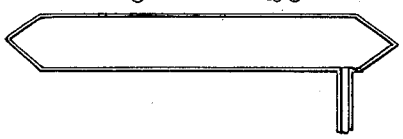
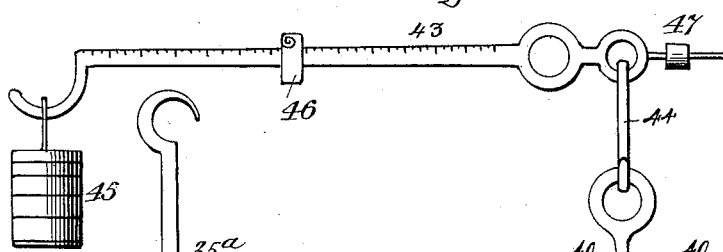
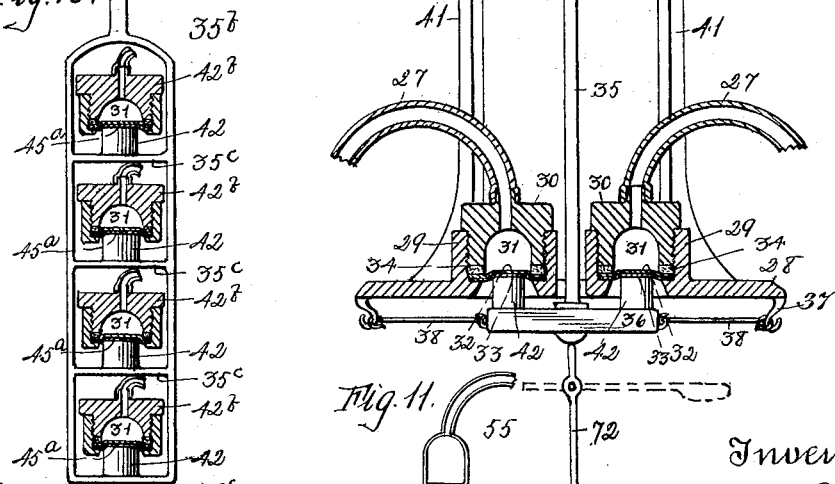
Witnesses
G. M. Anderson
Phil C. Masi.
Inventor
William Raab
by E. W. Anderson
his Attorney (No Model.) 7 Sheets—Sheet 3.
W. RAAB.
PNEUMATIC AND SPIRIT PRESSURE SCALE.

No. 566,698. Patented Aug. 25, 1896.

Witnesses
Geo. M. Anderson
Phil. LeMass

Inventor
William Raab
by E. W. Anderson
his Attorney.

(No Model.) 7 Sheets—Sheet 4.
W. RAAB.
PNEUMATIC AND SPIRIT PRESSURE SCALE.

No. 566,698. Patented Aug. 25, 1896.

Witnesses
Geo. M. Anderson
Phil. C. Mase.

Inventor
William Raab
by E. W. Anderson
his Attorney.

(No Model.) 7 Sheets—Sheet 5.
W. RAAB.
PNEUMATIC AND SPIRIT PRESSURE SCALE.
No. 566,698. Patented Aug. 25, 1896.

Witnesses
Geo. M. Anderson
Phil. C. Masi.

Inventor
William Raab
by E. W. Anderson
his Attorney.

(No Model.) 7 Sheets—Sheet 6.
W. RAAB.
PNEUMATIC AND SPIRIT PRESSURE SCALE.
No. 566,698. Patented Aug. 25, 1896.
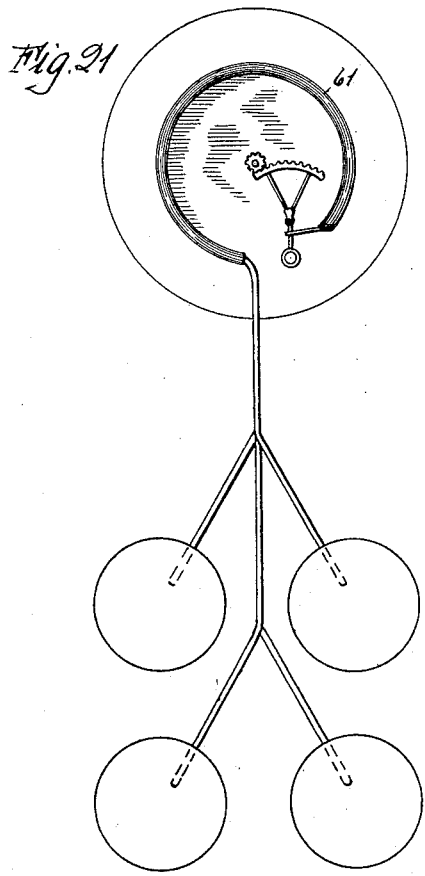
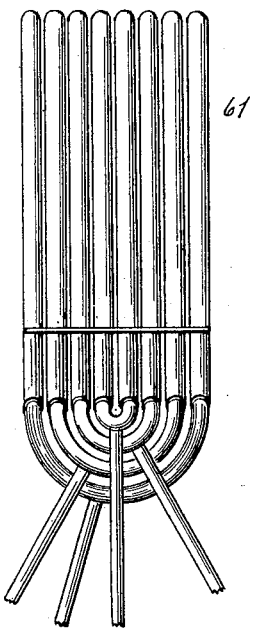
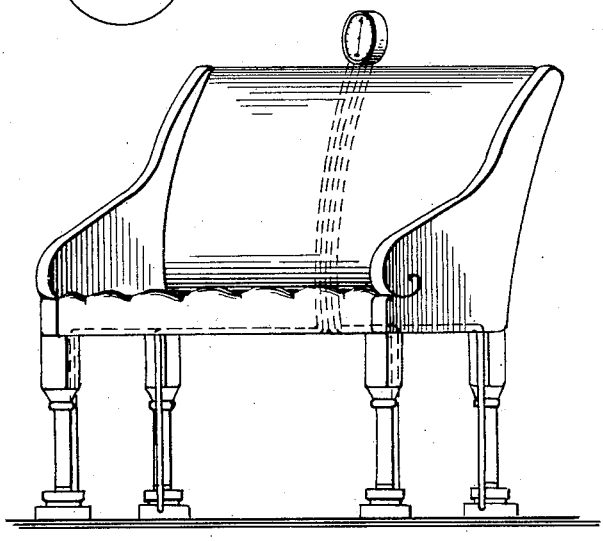
Witnesses
Geo. M. Anderson
Phil C. Masi.
Inventor
William Raab
by E. W. Anderson
his Attorney.

(No Model.) 7 Sheets—Sheet 7.

W. RAAB.
PNEUMATIC AND SPIRIT PRESSURE SCALE.

No. 566,698. Patented Aug. 25, 1896.

Witnesses
Geo. M. Anderson
Phill. Masi.

Inventor
William Raab
by E. W. Anderson
his Attorney.

UNITED STATES PATENT OFFICE.

WILLIAM RAAB, OF CEDAR FALLS, IOWA, ASSIGNOR TO THE INTERNATIONAL SCALE WORKS, OF WATERLOO, IOWA.

PNEUMATIC AND SPIRIT PRESSURE SCALE.

SPECIFICATION forming part of Letters Patent No. 566,698, dated August 25, 1896.

Application filed August 2, 1895. Serial No. 557,987. (No model.)

*To all whom it may concern:*

Be it known that I, WILLIAM RAAB, a citizen of the United States, and a resident of Cedar Falls, in the county of Black Hawk and State of Iowa, have invented certain new and useful Improvements in Pneumatic and Spirit Pressure Scales; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

Figure 12:
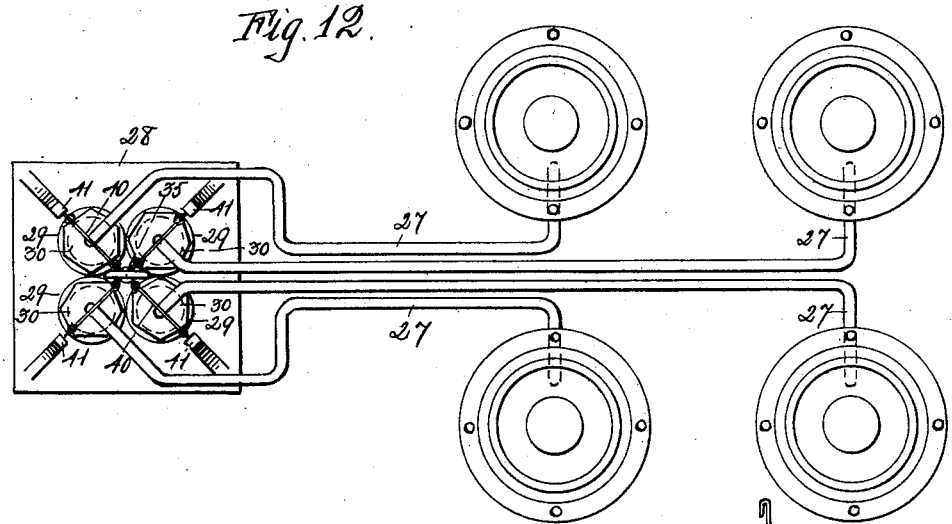
Figure 15:
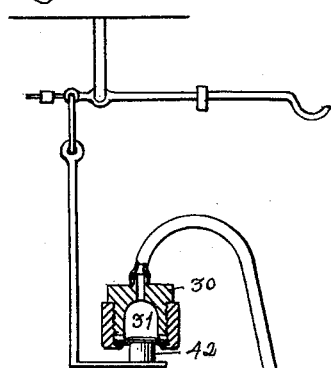
Figure 13:
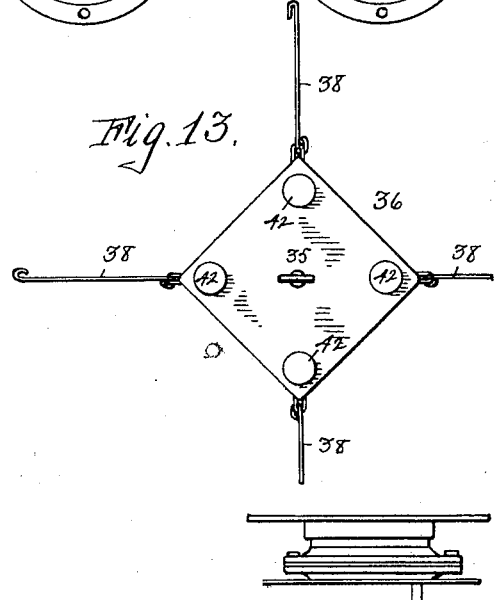
Figure 14:
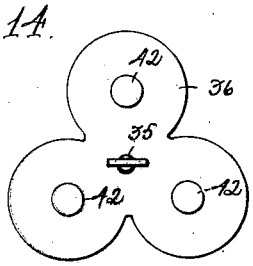
Figure 16:
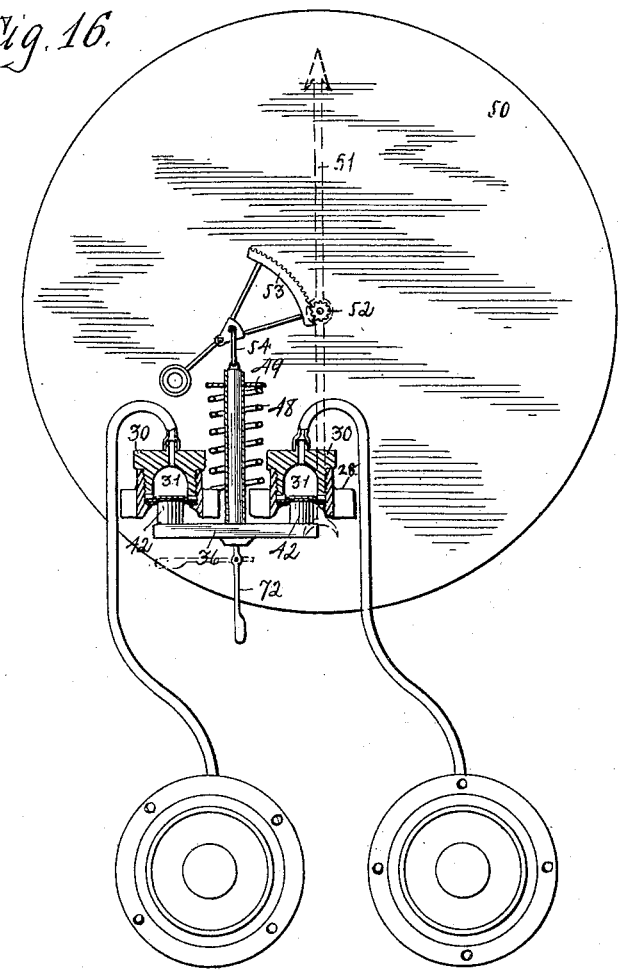
Figure 17:
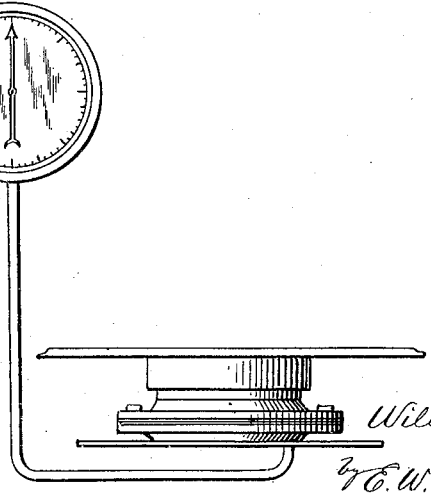
Figure 19:
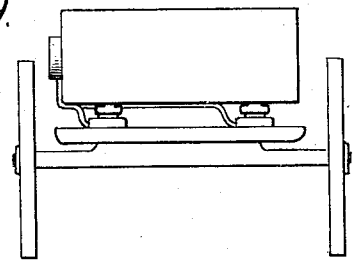
Figure 18:
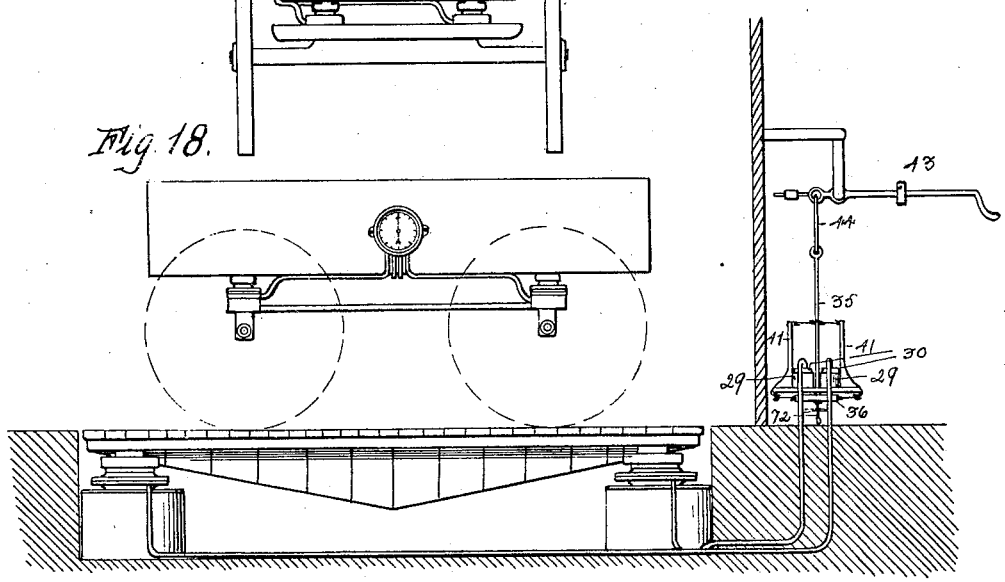
Figure 20:
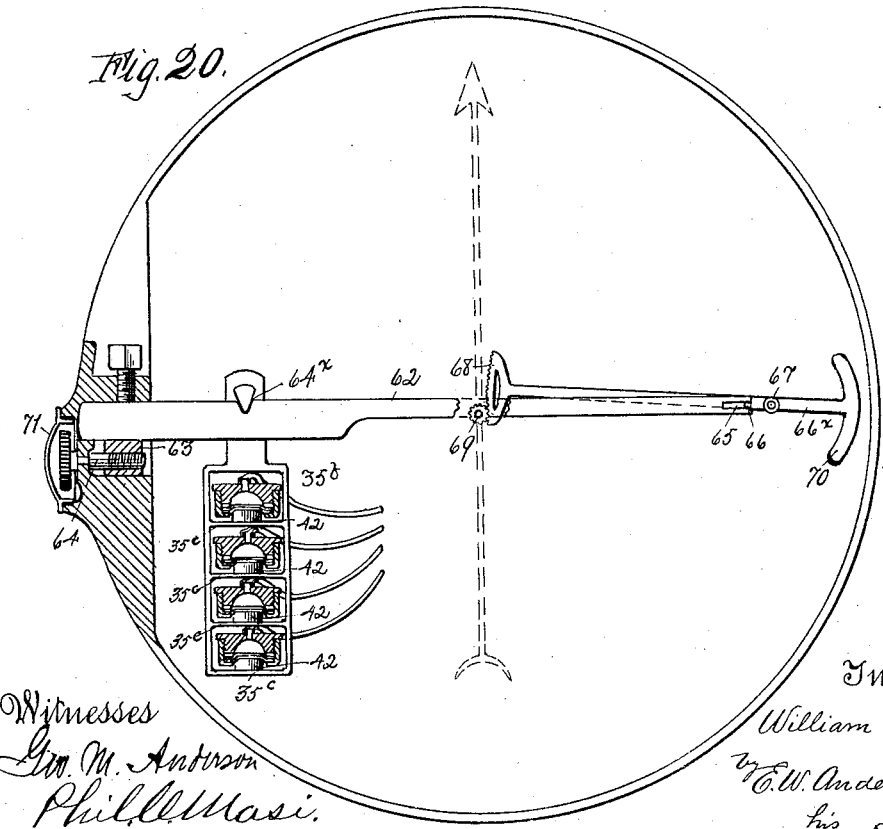
Figure 24:
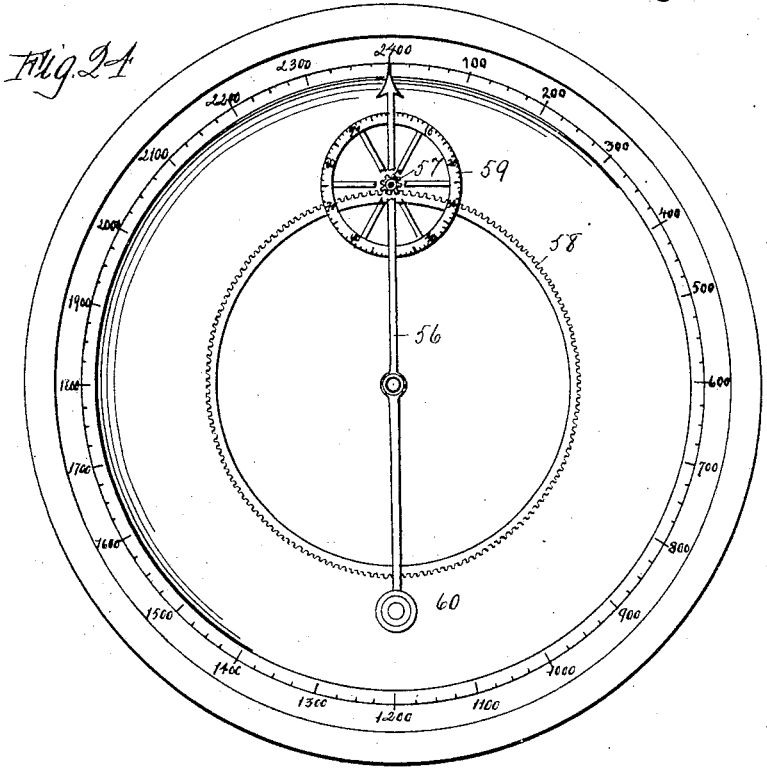
Figure 25:
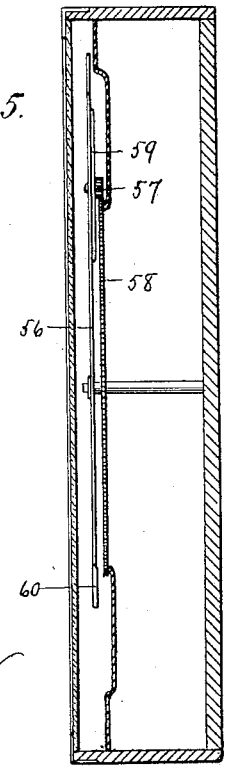

Figure 1 is a central vertical section of the invention adapted for the use of alcohol. Fig. 2 is a plan view of same with upper guard-plate and platform removed. Fig. 3 is a transverse vertical section through the drum vessel shown in Fig. 1, the plane of section being at right angles to that of Fig. 1. Fig. 4 is a detail of plunger. Fig. 5 is the hollow closed receptacle used in place of diaphragm. Fig. 6 is a detail of guide-plate. Fig. 7 is a central vertical section of invention as adapted for use of air. Fig. 8 shows hollow closed receptacle to be used in place of the diaphragm in this form. Fig. 9 is a sectional view of indicator. Fig. 10 is a sectional view of modification of indicator. Fig. 11 shows receptacle to be used in nipple in place of diaphragm. Fig. 12 is a plan view of weighing and indicating devices with four drums in use. Fig. 13 is a plan view of scale-rod, piston-blocks, &c., attached to flat plate 36. Fig. 14 shows same adapted for use when three weighing-drums are employed. Fig. 15 shows invention adapted for one weighing-drum. Fig. 16 is a sectional view, partly diagrammatic, of a dial-indicator, illustrating the use of a tested spring in the application of the invention to same. Fig. 17 shows the invention as adapted for a small counter-scale. Fig. 18 is a view, partly in section, illustrating the application of the invention to hay or coal scales. This view also shows a wagon resting on said scales and having pressure-drums and indicating mechanism applied thereto. Fig. 19 is an end view of wagon with the invention applied. Fig. 20 shows the invention applied to a modified form of dial-indicator. Fig. 21 shows the application of the invention to another form of dial-indicator having hollow curved springs. Fig. 22 is an enlarged end elevation of springs and connected pipes. Fig. 23 shows the application of the invention to a divan. Fig. 24 shows a form of dial for use in weighing heavy loads. Fig. 25 is a sectional view of same.

This invention has relation to weighing-scales, and is designed to provide mechanism of this character adapted to the various purposes hereinafter named wherein the weight of a body or object is ascertained by the measure of the pressure which it exerts on a confined fluid, the indicating devices of the scale being actuated through the medium of the transmitted pressure.

A further object of the invention consists in the provision of mechanism of the above character which is reliable in its action and is capable of measuring and indicating weights in the most accurate manner, being applicable to scales of various forms and sizes.

A further object is to provide a scale of the above character which can be applied to and form a part of the running-gear of a car, wagon, or other vehicle, and which not only forms a means for measuring the contents of the vehicle, but which also forms a spring for the same. Other objects of the invention will hereinafter appear.

With these objects in view the invention consists in the novel construction and combination of parts, all as hereinafter described, and pointed out in the appended claims.

In the practice of my invention I prefer to employ either air or alcohol as the medium acted upon by the weight, although other fluids may be employed. That part of the apparatus wherein the fluid is confined and in which it is acted upon by the weight will be termed herein a "weighing" or "pressure" drum, and I will first proceed to describe the particular form of such drum which I have found most suitable for use with a liquid medium, such as alcohol.

Referring to the accompanying drawings, Fig. 1, the numeral 1 designates a box or drum vessel, across the open top of which is secured a plate or diaphragm 2, which may be formed of rubber or from a thin sheet of brass. Over this diaphragm 2 is placed a disk 3, usually of leather, which, with the diaphragm, is secured in place by means of a ring 4, screwed to the box 1 in a liquid-tight manner, the leather forming a washer for the joint and also a protector for the diaphragm.

5 indicates a plunger which rests upon the leather 3, inside of the ring 4, from which it is separated by a space sufficient to avoid any contact or friction between the parts. Said plunger has upon its under face a boss 6, which fits a central circular opening in the leather 3, the latter being secured to the plunger by means of screws 7. Around said boss, and between the diaphragm and the leather, is a washer 8. The object in securing the leather to the plunger in the manner described is to provide a guide for the latter, whereby it is held to a true vertical movement and is prevented from contact with the ring 4. An inwardly-offset flange $a$ of the said ring limits the upward movement of the plunger.

9 is a guide-plate which is secured to the flange $a$, and which has a central circular opening through which the upper reduced portion of the plunger works neatly. Over said plate is placed a thin disk 10, of rubber, which is secured in position by the ring 11 and screws 11$^a$, which secure the guide-plate, and by a nut 12, threaded on the shoulder 13 of the plunger, upon which the said plate rests. The purpose of the disk 10 is that of a protector against dust and dirt, the guide-plate being usually of spider form.

14 is an upper guard-plate having a depending flange, which partially embraces the flange $a$ of the ring 4 for the purpose of excluding dirt. 15 is the outlet to the chamber of the box 1, and to which is connected the pipe which connects with the indicating devices.

In Fig. 5 is shown a hollow closed receptacle 16$^\times$, of rubber or thin spring metal, having an outlet 16$^a$. This box may be placed in the chamber of the box 1 in lieu of the diaphragm 2, with its outlet 16$^a$ extended through the opening in the bottom of said box 1. It will then form the receptacle for the alcohol, and constitutes the pressure-chamber, being in contact with the plunger. The use of this rubber receptacle secures the provision of a liquid-tight chamber for the alcohol and obviates the necessity for a tight joint between the box 1 and the ring 4.

16 16 designate lugs on the under side of the box 1, by means of which the weighing-drum may be bolted to a suitable bed.

17 indicates a platform upon which the object to be weighed is placed, and which rests upon the plunger.

I will now describe a modified form of weighing or pressure drum which I prefer to employ when air is to be used as the medium, deferring the description of the indicating devices and of the operation until later, for the reason that such devices are capable of being used interchangeably with either alcohol or air drums, while the operation is substantially the same in both cases.

Referring to Fig. 7, 18 designates a base-plate having on its upper face an annular and outwardly-flared flange 19, over which is stretched a diaphragm 22 and leather disk 21, similar to the corresponding parts in the form first described, said diaphragm and disk being secured by a ring 21$^a$ and screws 22. 23 is the plunger, which rests upon the leather 21, inside a flange 21$^b$ of the ring 21$^a$, said flange being inturned at its upper edge to form a guard for the plunger. 23$^a$ is the upper portion of the plunger which supports the platform. 25 is the outlet connection through the plate 18. It will be observed that this form is very similar in general character to that first described, the differences being for the most part in details of construction. I may also with this form employ a hollow rubber receptacle 26, Fig. 8, in place of the diaphragm.

For small counter-scales, such as shown in Fig. 17, it will be sufficient to employ one of the drums under the center of the platform, but with large forms, such as are used for weighing hay, coal, &c., one of the drums should be placed under each corner of the platform and connected each by independent pipes 27, of small diameter, with the indicator.

I will now describe the indicator shown in Fig. 9, and adapted for use with a scale having four weighing-drums under its platform.

28 designates a base-block, in which are bored four circular openings having each a hollow threaded boss 29, into which is screwed a nipple 30, having an interior chamber 31. To the nipples 30, which form receivers, are connected, respectively, the respective pipes 27 from the several weighing-drums of the scale. Placed over each of the openings in the block 28 is a rubber or thin metal diaphragm 32, underneath which is placed a leather disk 33.

34 is a washer-ring seated upon the marginal portion of the diaphragm, and upon which the nipple 30 screws to hold said diaphragm and leather in place.

35 designates a scale-rod which passes down through a central opening of the block 28 and has rigidly secured to its lower end portion a flat plate 36. Loosely attached to each corner portion of said plate and to depending hooks 37 of the block 28 are hanger-links 38. Near its upper end the rod has a collar 39, to which are loosely attached four similar hangers 40, whose opposite ends are connected to a flange, or to posts 41 of the block 28. The central opening of said block, through which the rod 35 passes, is made sufficiently large to avoid any contact with the walls thereof of the said rod, which is thus rendered free of friction. The hangers 38 and 40 equalize the rod and its bottom plate and prevent any side motion or twist thereof. Upon said plate 36 under each diaphragm 32 is a piston-block 42, whose upper face is in contact with the leather 33, which underlies said diaphragm.

43 designates a suspended scale-beam, to the short arm of which the scale-rod is connected by a link 44.

45 are the weights of said beam, 46 the sliding poise thereof, and 47 a counterbalance-weight.

The operation is as follows: The pressure-chamber of the drums, the connecting-pipes, and the receiving-nipples being completely filled with air to the desired pressure, or alcohol, as the case may be, any object placed upon the platform exerts a direct pressure thereon in exact proportion to its weight, and this pressure is transmitted to the receiving-chambers of the nipples 30, causing a downward pressure or expansion of the diaphragms 32 upon the piston-blocks 42. This pressure causes a bearing down on the plate 36, which pulls down the scale-rod to operate the beam. The area of the pressure-faces of all the piston-blocks should be exactly the same, as must also the areas of the plungers of the drums. Supposing the area of each of the plungers to be nine square inches, and the area of each of the piston-blocks to be one square inch, an object weighing one hundred pounds being placed upon the center of the weighing-platform, each plunger will press upon the air or alcohol with a force of twenty-five pounds, and the pressure transmitted to each piston-block will be twenty-five pounds, or one hundred pounds upon the four blocks, causing the scale-rod to pull upon the beam with a pressure of one hundred pounds. If the object is placed upon one corner of the platform directly over one drum, that drum will transmit a pressure to the scale-rod through one of the piston-blocks of one hundred pounds. Owing to the fact that each drum has an independent connection with the indicator, it will be apparent that no matter upon what portion of the platform the object is placed each drum will receive and transmit its proportion of the pressure and the total action on the scale-beam is in all cases a correct measure of the weight.

Where a liquid, as alcohol, is employed, there is of course no compression, but the pressure is transmitted directly, but with air compression takes place, and the measure of the compression is the measure of the weight. A scale correctly constructed in accordance with the above affords a very sensitive and accurate means for weighing, since there is no chance for error due to friction. The connecting-pipes employed may be either flexible or rigid and are of small diameter. The indicator may be situated at any desired distance from the platform.

Fig. 11 shows a plan view of a base-block adapted for use when three weighing-drums are employed instead of four.

Fig. 10 shows a modified form of receiver, wherein the scale-rod $35^a$, corresponding to the rod 35 in the form first described, is formed with a chamber $35^b$, having a series of shelves or supports $35^c$, upon each of which is placed one of the piston-blocks 42, having a diaphragm arrangement $45^a$ and a receiver-nipple $42^b$ similar in character to those first described. With this form the pressure is directly vertical and no guides are needed to equalize the action and prevent side motion.

Fig. 16 shows a dial-indicator, the arrangement of the bed-block 28, receivers, diaphragms, piston-blocks, plate 36, and connections being the same as in Fig. 9. The scale-rod, however, instead of being arranged as shown in said figure, is held up by a tested spring 48, which is placed between the block 28 and a collar 49 on the rod. 50 is the dial; 51, the hand or pointer, the post of which carries a pinion 52, engaged by a toothed sector 53, moved by a connection 54 with the scale-rod. As the pressure comes upon the piston-blocks said spring is compressed as the rod is drawn down, and as soon as the pressure is released the scale-rod is returned by the spring to its original position and the hand or pointer moved back to the zero or starting point of the dial.

55, Fig. 11, indicates a hollow rubber bulb which may be placed in the receiving-chamber of the nipples of any of the indicators above described, in which case it forms the receiver, its advantage being that the necessity for a tight joint between the nipples and the block 28 is obviated.

Fig. 24 shows a form of dial designed for use in connection with large scales, the outer dial-figures indicating the weight in hundreds. The pointer-arm 56 carries a pinion 57, which runs in a circular concentric rack 58. Attached to said pinion is a wheel 59, on which is marked a scale of figures designed to indicate weight in pounds. As the pointer moves from one main division of the dial to the other this wheel 59 is moved by its pinion 57 to make a complete revolution, the correct weight in pounds as marked on said wheel being indicated by the figure or figures on the line of the pointer in all positions of the same. 60 is a counterbalance-arm for the pointer.

Fig. 22 shows another form of indicator, wherein the dial is provided with a series of hollow curved springs 61, similar to those used in steam-gages, two for each weighing-drum. These springs are all brazed together at one end, as indicated, each pipe being branched and connected to two of the springs.

Fig. 20 shows another form of dial-indicator, in which a stiff metal beam 62 is placed inside the dial box or case, being held at one end portion upon an adjustable fulcrum-block 63 and by a screw 64. Hung on this beam by a pivot $64^\times$ is one of the receivers shown in Fig. 10. The distant end of the beam has a slot 65, which engages a pin 66 on the long arm of a lever $66^\times$, pivoted to the dial-case at 67. The long arm of this lever carries a toothed segment 68, that engages a pinion 69, which carries the hand or pointer. On the opposite arm of said lever is a counterbalance-weight 70. The movement of beam 62 required to make a complete revolution of the hand or pointer is very slight. After the dial has been marked and tested and the block 63 adjusted to the proper point, a cap 71 is placed over the adjusting-screw for said block, and is sealed in such a manner that it cannot be removed.

In Fig. 15 I have shown the invention applied to a small counter-scale with one drum.

Fig. 18 indicates the invention applied to a larger platform-scale, wherein the drums are set in a pit. The pressure-pipes are shown as running into an office and connected to a beam-indicator. For this form of scale I prefer to use alcohol as the medium for transmitting pressure.

In the two other forms just referred to a dial-indicator is preferable.

In Figs. 18 and 19 I have shown the invention applied to a wagon, one of the drums being secured to the bolsters under each corner of the body, which rests thereon. The pipes from the drums run to a receiver and indicator mechanism, suitably supported upon the body, as indicated, said pipes being preferably of flexible material. For this purpose I prefer to employ air in the drums, as the latter then form excellent springs for the wagon. A similar application may be made to freight-cars and other vehicles.

Fig. 23 shows the application to a chair or divan, one of the drums being placed under each leg thereof, as indicated.

In the case of scales which are frequently driven over, or where they are applied to a vehicle, it becomes desirable to provide means whereby the action of the scale-rod, which works the dial-pointer or the beam, may be prevented, except at such time as weighing is to be done, in order to avoid undue wear of the parts. This I accomplish by means of a lever 72, arranged to be moved under the plate which supports the piston-blocks and prevent its movement. (See Figs. 9, 16, and 18.)

The lever is so placed that it drops of itself into position to form the lock.

Having thus described my invention, what I claim as new, and desire to secure by Letters Patent, is—

1. In weighing mechanism, the combination of the drum vessel 1, having a chamber therein whose upper wall is flexible, a disk 3, also flexible placed upon said flexible wall, the annulus 4 secured to said vessel and seating upon and securing the marginal portion of the said disk, the plunger 5 which rests upon the said disk and which is of slightly less diameter than the annulus, said plunger having on its under face a boss 6, which fits an opening in the said disk, said annulus having an inwardly-offset flange $a$ which limits the upward movement of the plunger, the guide-plate 9 secured to said flange and having a central opening through which a reduced portion of the plunger works, the disk 10 placed over said plate, the ring 11, which secures said disk, and the upper guard-plate 14 having a depending flange which partially embraces the flange $a$, together with a pipe connected to an outlet of the said chamber and pressure registering and indicating mechanism connected to said pipe, substantially as specified.

2. In weighing mechanism, the combination with one or more pressure-drums, and a weighing-platform supported thereon, of indicating mechanism having a pivoted beam or pointer, a scale-rod 35 suspended from an arm of said pointer, a plate 36 carried by the said rod, a series of pressure-blocks or pistons 42 carried by the said plate, a block 28 located above the plate 36, and having therein, directly over each piston, an opening formed with a hollow boss, a chambered nipple secured to each of said bosses and connected with one of the said drums, a diaphragm forming the bottom wall of the chamber of each of said nipples, and resting upon one of the said pistons, the equalizing-hangers 38 loosely attached to the plate 36 and to the block 28, and the similar hangers 40 attached to a collar of the scale-rod and to the said block, substantially as specified.

3. In weighing mechanism, the combination with the scale-rod, the pistons carried thereby, and means for operating said pistons, of a lever device arranged to support said scale-rod when not in use, substantially as specified.

4. In weighing mechanism, the combination of the block 28, the receiving-nipples attached thereto, the flexible diaphragms secured by said nipples and closing the receiving-chambers thereof, the vertically-movable scale-rod, the pistons carried thereby one in contact with each of said diaphragms, and the equalizing-hangers for said rod, substantially as specified.

5. In weighing mechanism, a dial having a scale thereon, a counterbalanced pointer, a pinion carried by the indicating-arm of the pointer, an indicating-wheel attached to said pinion, and a circular stationary rack engaged by said pinion, substantially as specified.

In testimony whereof I affix my signature in presence of two witnesses.

WILLIAM RAAB.

Witnesses:
    JOHN H. LEAVITT,
    JOSEPH L. LEAVITT.